(12) United States Patent
Clegg et al.

(10) Patent No.: US 7,917,588 B2
(45) Date of Patent: Mar. 29, 2011

(54) MANAGING DELIVERY OF ELECTRONIC MESSAGES USING BOUNCE PROFILES

(75) Inventors: Paul J. Clegg, Pacifica, CA (US); Lonhyn Jasinskyj, San Bruno, CA (US)

(73) Assignee: Ironport Systems, Inc., San Bruno, CA (US)

( * ) Notice: Subject to any disclaimer, the term of this patent is extended or adjusted under 35 U.S.C. 154(b) by 902 days.

(21) Appl. No.: 11/139,374

(22) Filed: May 26, 2005

(65) Prior Publication Data

US 2005/0265319 A1      Dec. 1, 2005

Related U.S. Application Data

(60) Provisional application No. 60/575,658, filed on May 29, 2004.

(51) Int. Cl.
*G06F 15/16* (2006.01)

(52) U.S. Cl. ......................................... 709/206; 709/207

(58) Field of Classification Search .................... 370/352
See application file for complete search history.

(56) References Cited

U.S. PATENT DOCUMENTS

| | | | |
|---|---|---|---|
| 5,319,776 A | | 6/1994 | Hile et al. |
| 5,555,346 A | * | 9/1996 | Gross et al. ...................... 706/45 |
| 5,623,600 A | | 4/1997 | Ji et al. |
| 5,646,982 A | * | 7/1997 | Hogan et al. ............... 379/88.22 |
| 5,802,178 A | | 9/1998 | Holden et al. |
| 5,805,810 A | | 9/1998 | Maxwell |
| 5,832,208 A | | 11/1998 | Chen et al. |
| 5,889,943 A | | 3/1999 | Ji et al. |
| 5,915,087 A | | 6/1999 | Hammond et al. |
| 5,933,416 A | | 8/1999 | Schenkel et al. |
| 5,937,162 A | * | 8/1999 | Funk et al. ..................... 709/206 |
| 5,958,005 A | | 9/1999 | Thorne et al. |

(Continued)

FOREIGN PATENT DOCUMENTS

WO      WO 01/67330 A1      9/2001

(Continued)

OTHER PUBLICATIONS

Bryan Costales, with Eric Allman, "sendmail, 3$^{rd}$ Edition", O'Reilly & Associates (2003) ISBN: 1-56592-839-3, pp. 2-3, 10-11, 15-17, 105, 265-270, 298-299, 440-445, 450-451, 458-459, 464-471, 478-479, 1022, 1064-1069.*

(Continued)

*Primary Examiner* — Saleh Najjar
*Assistant Examiner* — Robert Shaw
(74) *Attorney, Agent, or Firm* — Hickman Palermo Truong & Becker LLP

(57) ABSTRACT

A method and apparatus for managing the delivery of electronic messages using bounce profiles is provided. A bounce profile is a set of data that may be used by a mail server in redelivering an electronic message that was not successfully delivered (i.e., bounced) to a recipient of an electronic message. A sender mail server, upon determining that an electronic message sent to a recipient mail server bounced, may select a bounce profile, among a plurality of bounce profiles, that is associated with a trait of the bounced electronic message, such as a domain of the recipient or a message type of the bounced electronic message. The sender mail server determines whether, and how, to redeliver the bounced electronic message to the recipient mail server based on information specified by the selected bounce profile.

15 Claims, 4 Drawing Sheets

U.S. PATENT DOCUMENTS

| | | | |
|---|---|---|---|
| 5,968,176 | A | 10/1999 | Nesset et al. |
| 5,983,270 | A | 11/1999 | Abraham et al. |
| 5,983,350 | A | 11/1999 | Minear et al. |
| 5,999,967 | A * | 12/1999 | Sundsted ............... 709/206 |
| 6,003,084 | A | 12/1999 | Green et al. |
| 6,052,709 | A | 4/2000 | Paul |
| 6,072,942 | A | 6/2000 | Stockwell et al. |
| 6,151,491 | A * | 11/2000 | Farris et al. ............... 455/412.2 |
| 6,161,130 | A | 12/2000 | Horvitz et al. |
| 6,192,114 | B1 | 2/2001 | Council |
| 6,195,587 | B1 | 2/2001 | Hruska et al. |
| 6,212,558 | B1 | 4/2001 | Antur et al. |
| 6,226,670 | B1 | 5/2001 | Ueno et al. |
| 6,266,692 | B1 | 7/2001 | Greenstein |
| 6,289,105 | B1 | 9/2001 | Murota |
| 6,330,590 | B1 * | 12/2001 | Cotten ..................... 709/206 |
| 6,341,309 | B1 | 1/2002 | Vaid et al. |
| 6,393,568 | B1 | 5/2002 | Ranger et al. |
| 6,408,336 | B1 | 6/2002 | Schneider et al. |
| 6,421,709 | B1 | 7/2002 | McCormick et al. |
| 6,434,600 | B2 * | 8/2002 | Waite et al. ............... 709/206 |
| 6,460,050 | B1 * | 10/2002 | Pace et al. ............... 1/1 |
| 6,484,261 | B1 | 11/2002 | Wiegel |
| 6,499,021 | B1 * | 12/2002 | Abu-Hakima ............... 706/10 |
| 6,502,131 | B1 | 12/2002 | Vaid et al. |
| 6,507,866 | B1 | 1/2003 | Barchi |
| 6,539,430 | B1 | 3/2003 | Humes |
| 6,587,550 | B2 | 7/2003 | Council et al. |
| 6,591,291 | B1 | 7/2003 | Gabber et al. |
| 6,609,196 | B1 | 8/2003 | Dickinson, III et al. |
| 6,650,890 | B1 | 11/2003 | Irlam et al. |
| 6,654,787 | B1 * | 11/2003 | Aronson et al. ............. 709/206 |
| 6,675,162 | B1 | 1/2004 | Russell-Falla et al. |
| 6,842,772 | B1 * | 1/2005 | Delaney et al. ............... 709/206 |
| 6,854,007 | B1 * | 2/2005 | Hammond ............... 709/206 |
| 6,941,304 | B2 * | 9/2005 | Gainey et al. ............... 707/10 |
| 6,981,023 | B1 * | 12/2005 | Hamilton et al. ............. 709/206 |
| 7,024,178 | B2 * | 4/2006 | Uchimura ............... 455/412.1 |
| 7,177,909 | B2 * | 2/2007 | Stark et al. ............... 709/206 |
| 7,181,498 | B2 | 2/2007 | Zhu et al. |
| 7,219,148 | B2 | 5/2007 | Rounthwaite et al. |
| 7,272,853 | B2 | 9/2007 | Goodman et al. |
| 7,395,314 | B2 * | 7/2008 | Smith et al. ............... 709/206 |
| 7,409,708 | B2 | 8/2008 | Goodman et al. |
| 7,428,580 | B2 * | 9/2008 | Hullfish et al. ............... 709/207 |
| 7,475,118 | B2 | 1/2009 | Leiba et al. |
| 2001/0005885 | A1 | 6/2001 | Elgamal et al. |
| 2001/0032137 | A1 * | 10/2001 | Bennett et al. ............... 705/14 |
| 2002/0004908 | A1 | 1/2002 | Galea |
| 2002/0016824 | A1 | 2/2002 | Leeds |
| 2002/0120705 | A1 * | 8/2002 | Schiavone et al. ............. 709/207 |
| 2002/0133469 | A1 | 9/2002 | Patton |
| 2002/0144154 | A1 * | 10/2002 | Tomkow ............... 713/201 |
| 2002/0160757 | A1 * | 10/2002 | Shavit et al. ............... 455/414 |
| 2002/0169954 | A1 * | 11/2002 | Bandini et al. ............. 713/153 |
| 2002/0184315 | A1 | 12/2002 | Earnest |
| 2003/0028580 | A1 * | 2/2003 | Kucherawy ............... 709/101 |
| 2003/0050988 | A1 | 3/2003 | Kucherawy |
| 2003/0055724 | A1 * | 3/2003 | Battin et al. ............... 705/14 |
| 2003/0069933 | A1 * | 4/2003 | Lim et al. ............... 709/206 |
| 2003/0074411 | A1 * | 4/2003 | Nale ............... 709/206 |
| 2003/0088824 | A1 * | 5/2003 | Ayan ............... 715/500 |
| 2003/0105800 | A1 * | 6/2003 | Cullen ............... 709/201 |
| 2003/0110224 | A1 | 6/2003 | Cazier et al. |
| 2003/0134621 | A1 * | 7/2003 | Yabe et al. ............... 455/413 |
| 2003/0149726 | A1 | 8/2003 | Spear |
| 2003/0158905 | A1 * | 8/2003 | Petry et al. ............... 709/206 |
| 2003/0167402 | A1 | 9/2003 | Stolfo et al. |
| 2003/0172291 | A1 | 9/2003 | Judge et al. |
| 2003/0191969 | A1 | 10/2003 | Katsikas |
| 2003/0210649 | A1 * | 11/2003 | Bondi ............... 370/229 |
| 2003/0233490 | A1 * | 12/2003 | Stark et al. ............... 709/206 |
| 2004/0019651 | A1 | 1/2004 | Andaker |
| 2004/0054742 | A1 | 3/2004 | Gruper et al. |
| 2004/0054886 | A1 * | 3/2004 | Dickinson et al. ............. 713/153 |
| 2004/0058673 | A1 | 3/2004 | Irlam et al. |
| 2004/0064371 | A1 | 4/2004 | Crapo |
| 2004/0073617 | A1 | 4/2004 | Milliken et al. |
| 2004/0083230 | A1 | 4/2004 | Caughey |
| 2004/0093384 | A1 * | 5/2004 | Shipp ............... 709/206 |
| 2004/0117648 | A1 | 6/2004 | Kissel |
| 2004/0133561 | A1 * | 7/2004 | Burke ............... 707/3 |
| 2004/0139314 | A1 | 7/2004 | Cook et al. |
| 2004/0177110 | A1 | 9/2004 | Rounthwaite et al. |
| 2004/0199595 | A1 * | 10/2004 | Banister et al. ............... 709/207 |
| 2005/0033812 | A1 * | 2/2005 | McCarthy et al. ............. 709/206 |
| 2005/0064850 | A1 | 3/2005 | Irlam et al. |
| 2005/0071432 | A1 | 3/2005 | Royston, III |
| 2005/0246440 | A1 | 11/2005 | Yu |
| 2005/0283837 | A1 | 12/2005 | Olivier et al. |
| 2007/0201496 | A1 * | 8/2007 | Motoyama ............... 370/410 |
| 2008/0209347 | A1 * | 8/2008 | Malik et al. ............... 715/758 |

FOREIGN PATENT DOCUMENTS

| | | |
|---|---|---|
| WO | WO 02/25464 A1 | 3/2002 |
| WO | WO 02/39356 A1 | 5/2002 |
| WO | WO 02/019069 A | 7/2002 |

OTHER PUBLICATIONS

Viega et al, Mailman: The GNU Mailing List Manager, USENIX Technical Program, in: Proceedings of the 12th Systems Administration Conference (LISA '98), 1998.*

Joe Cooper, The Book of Webmin: Or: How I Learned to Stop Worrying and Love UNIX, 2003, pp. 203-217.*

Avery, Mike, "Networking: Product Reviews: MimeSweeper neatly cleans up e-mail Web Content," Info World Jun. 23, 1997, reproduced by High Beam Research LLC., 3 pages. (Reference on CD-ROM).

Cashramspam.com, "CashRamSpam.com," file://C:\DOCUME~1\LOCALS~1\temp\2OJL2VHQ.htm, printed Feb. 19, 2003, 9 pages. (Reference on CD-ROM).

"Check Point Firewalls," [Online], retrieved from the internet URL: <http://www.trellisnet.com/Security/Checkpoint/firewalls.asp>, Trellis Network Services, Retrieved on May 18, 2004, pp. 1-3. (Reference on CD-ROM).

"Check Point Signs Technology licensing Agreement with RSA Data Security," Check Point Software Technologies LTD., Sep. 18, 1995, 2 pages. (Reference on CD-ROM).

"Check Point Software technologies to Secure Backweb's Internet Broadcasting Software," Check Point Software Technologies LTD., reproduction of article from Internet World dated Dec. 11, 1996, 2 pages. (Reference on CD-ROM).

"Control Data Systems Partners With Check Point Software to Resell FireWall-1," Check Point Software Technologies LTD., Feb. 21, 1996, 2 pages. (Reference on CD-ROM).

International Searching Authority, "Notification of Transmittal of the International Search Report and the Written Opinion of the International Searching Authority, or the Declaration," PCT/US04/00969, Aug. 18, 2004, 10 pages. (Reference on CD-ROM).

Current Claims in PCT patent application, International Application No. PCT/US03/37417, 16 pages. (Reference on CD-ROM).

Current Claims in International Application, application No. PCT/US04/00969, 19 pages. (Reference on CD-ROM).

International Searching Authority, "Notification of Transmittal of the International Search Report or the Declaration," PCT/US03/37417, Jun. 8, 2004, 7 pages. (Reference on CD-ROM).

Declude, "List of All Known DNS-based Spam Databases," Apr. 20, 2004, http://www.declude.com/Articles.asp?ID=97, data retrieved Jun. 27, 2005, pp. 1-21. (Reference on CD-ROM).

Dwork, Cynthia, et al., "Pricing via Processing or Combatting Junk Mail," Draft of full version, preliminary version of this paper was presented at Crypto '92, pp. 1-11. (Reference on CD-ROM).

eSOFT.COM, "InstaGate EX2—the Firewall with a Future," eSoft Incorporated, 2001, 9 pages. (Reference on CD-ROM).

"eTrust Secure Content Manager," Computer Associates International Inc., 2003, pp. 1-7. (Reference on CD-ROM).

"Fighting Fire with Fire," Computer Reseller News, n757, pp. 143-152, Oct. 6, 1997, 14 pages. (Reference on CD-ROM).

"F-Secure Internet Gatekeeper," F-Secure Data Sheet, F-Secure Corporation, 2 pages. (Reference on CD-ROM).

Google Groups, "MIME mail bombs," Message 1 thread from Selden E. Ball Jr., dated Feb. 28, 1995, 3 pages. (Reference on CD-ROM).

Google Groups, "PMDF and VSWEEP Virus Scanner," Message 1 thread from Eileen Byrne Telecom 617-386-2181, dated Nov. 13, 1995, 2 pages. (Reference on CD-ROM).
Google Groups, "Virus Scanning", Message 1 Thread from John F. Reddington dated Jul. 25, 1995, 5 pages. (Reference on CD-ROM).
Google Groups, "Virus Scanning", Sara.Appleyard, Sep. 8, 1996, 5 pages. (Reference on CD-ROM).
"Integralis Announces MIMEsweeper Compatible with Check Point FireWall-1 on Single NT Server," Checkpoint Software Technologies LTD., Sep. 16, 1996, 2 pages. (Reference on CD-ROM).
Kent, Stephen T., "Internet Privacy Enhanced Email," Communications of the ACM, vol. 36, No. 8, Aug. 1993, pp. 48-60. (Reference on CD-ROM).
Lemos, Robert, "Paying Up for a Spam Seal of Approval," Jun. 24, 2002, http://news.com.com/2100-1001-938976.html, printed Feb. 19, 2003, pp. 1-3. (Reference on CD-ROM).
Mason, Justin, "SpamAssasin Prehistory: filter.plx," [Online], [retrieved on Jun, 20, 2005]. Retrieved from the internet:http://spamassasin.apache.org/prehistory/. (Reference on CD-ROM).
McCullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages. (Reference on CD-ROM).
MIMEsweeper 2.0 Press Release, "Integralis releases MIMEsweeper Version 2.0 with SMTP mail security support," [online], Jan. 15, 1996, [retrieved on Jun. 8, 2004]Retrieved from the internet: http://web.archive.org/web/19961112103826/www.nha.com/rel20.htm (Reference on CD-ROM).
MIMEsweeper 2.3 Press Release, "Integralis announces version 2.3 of MIMEsweeper with new email security features," reproduced from Email World, Jun. 13, 1996, 2 pages. (Reference on CD-ROM).
"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).
"New Product 'E-Mail Virus Wall' protects companies from e-mail-borne viruses, including new macro viruses," Business Wire, p 02160157, Feb. 16, 1996, 3 pages. (Reference on CD-ROM).
Nicholas, Nick, "Realtime Blackhole List, Spamware Defined," downloaded on May 27, 2004 from <http://mail-abuse.org/rbl/spamware.htm, 2 pages. (Reference on CD-ROM).
Olawsky, Duane et al., "Developing and Using a 'Policy Neutral' Access Control Policy," Secure Computing Corporation, Dec. 2, 1996, pp. 60-67.
Omniva, "Omniva Policy Manager," Technical White Paper, Ominiva Policy Systems, Jan. 2004, pp. 1-23. (Reference on CD-ROM).
Oppliger, Rolf, "Internet Security; Firewalls and Bey," Communication of the ACM, vol. 40, No. 5, May 1997, pp. 92-102. (Reference on CD-ROM).
Postini Inc., "Postini Perimeter Manager: The Industry's Leading Email Security and Management Solution," Postini Inc., 2004, 4 pages. (Reference on CD-ROM).
"Prevention of Forged-Spam email via Sendmail (Relay Disable)" <http://docsrv.sco.com/MM_admin/mmadminC.spam_forge.html>, Nov. 1999. (Reference on CD-ROM).
"Product Overview—IronMail: The Secure Email Gateway Appliance," CipherTrust, 2 pages. (Reference on CD-ROM).
Prolin, P. et al., "Network Security Probe", Telecom Bretagne, Nov. 1994, pp. 229-240. (Reference on CD-ROM).
"Raptor Systems and Trend Micro to Develop Integrated Firewall/Virus Wall; Security Partnership to Protect Against Unauthorized Access and Viruses," Business Wire, p 05030072, May 3, 1996, 2 pages. (Reference on CD-ROM).
Rhyolite Software, "Distributed Checksum Clearinghouse," [Online] [Retrieved on Jun. 20, 2005], retrieved from the internet: http://www.rhyolite.com/anti-spam/dcc, pp. 1-5, (Reference on CD-ROM).
Sullivan, Andy "Buffalo Spammer Sentenced to 3-1/2 to 7 years", U.S. National-Reuters downloaded on May 27, 2004 from <http://news.yahoo.com/news?tmpl=story&u=/nm/20040527/us_nm/tech_spam_dc>, 2 pages_ (Reference on CD-ROM).
"Surf Control E-mail Filter," http://www.surfcontrol.com/uploadedfiles/SEF_datasheet.pdf, SurfControl plc., 4 pages. (Reference on CD-ROM).

"Symantic Ships Norton AntiVirus for Internet Email Gateways," PR Newswire, p 0224SFM068, Feb. 24, 1997, 4 pages. (Reference on CD-ROM).
"The Elm Filter System Guide," CETS Answers, Computing and Educational Technology Services, University of Pennsylvania, Jun. 24, 2003, 8 pages. (Reference on CD-ROM).
"The Elm Filter System Guide, What the Filter Program is, and How to Use It," San Diego State University ROHAN Academic Computing, May 29, 1996, pp. 1-8, available online at http://www-rohan.sdsu.edu/filter.html.
Thorud, G., "Message Handling Systems," Telektronikk, vol. 90, No. 2, 1994, pp. 86-88. (Reference on CD-ROM).
Trend Micro, "Policy-based Antivirus and Content Security for the Messaging Gateway," White Paper, Trend Micro Interscan Messaging Security Suite, Jun. 2002, pp. 1-20. (Reference on CD-ROM).
Trumbo, Jan et al., "Features: Big, Bad E-mail," Network Computing, Oct. 8, 1996, 4 pages, available at <http://www.nwc.com/716/716f2.html>.
Weisband, Suzanne P. et al., "Managing User Perceptions of Email Privacy," Communications of the ACM, vol. 38, No. 12, Dec. 1995, pp. 40-47. (Reference on CD-ROM).
1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages. (Reference on CD-ROM).
International Searching Authority, "Notification of transmittal of the international search report and the written opinion of the international searching authority, or the declaration," international application No. PCT/US2005/005498, dated May 12, 2005, 12 pages. (Reference on CD-ROM).
Current Claims, PCT/US2005/005498, 14 pages. (Reference on CD-ROM).
International Searching Authority, "Notification of transmittal of the international search report and the written opinion of the international searching authority, or the declaration," International Application No. PCT/US05/19037, dated Oct. 24, 2005, 10 pages.
Current claims, PCT/US05/19037, 12 pages.
International Searching Authority, "Notification of transmittal of the international search report and the written opinion of the international searching authority, or the declaration," International Application No. PCT/US05/18569, dated Oct. 17, 2005, 10 pages.
Current claims, PCT/US05/18569, 7 pages.
Avery, Mike, "Networking: Product Reviews: MimeSweeper neatly cleans up e-mail Web Content," Info World Jun. 23, 1997, reproduced by High Beam Research LLC., 3 pages.
Cashramspam.com, "CashRamSpam.com," file://C:\DOCUME~1\Locals~1\temp\2OJL2VHQ.htm, printed Feb. 19, 2003, 9 pages.
"Check Point Firewalls," [Online], retrieved from the internet URL: <http://www.trellisnet.com/Security/Checkpoint/firewalls.asp>, Trellis Network Services, Retrieved on May 18, 2004, pp. 1-3.
"Check Point Signs Technology licensing Agreement with RSA Data Security," Check Point Software Technologies LTD., Sep. 18, 1995, 2 pages.
"Check Point Software technologies to Secure Backweb's Internet Broadcasting Software," Check Point Software Technologies LTD., reproduction of article from Internet World dated Dec. 11, 1996, 2 pages.
"Control Data Systems Partners With Check Point Software to Resell FireWall-1," Check Point Software Technologies LTD., Feb. 21, 1996, 2 pages.
MIMEsweeper 2.3 Press Release, "Integralis announces version 2.3 of MIMEsweeper with new email security features," reproduced from Email World, Jun. 13, 1996, 2 pages.
Declude, "List of All Known DNS-based Spam Databases," Apr. 20, 2004, http://www.declude.com/Articles.asp?ID=97, data retrieved Jun. 27, 2005, pp. 1-21.
Dwork, Cynthia, et al., "Pricing via Processing or Combatting Junk Mail," Draft of full version, preliminary version of this paper was presented at Crypto '92, pp. 1-11.
eSOFT.COM, "InstaGate EX2—the Firewall with a Future," eSoft Incorporated, 2001, 9 pages.

"eTrust Secure Content Manager," Computer Associates International Inc., 2003, pp. 1-7.

"Fighting Fire with Fire," Computer Reseller News, n757, pp. 143-152, Oct. 6, 1997, 14 pages.

"F-Secure Internet Gatekeeper," F-Secure Data Sheet, F-Secure Corporation, 2 pages.

Google Groups, "MIME mail bombs," Message 1 thread from Selden E. Ball Jr., dated Feb. 28, 1995, 3 pages.

Google Groups, "PMDF and VSWEEP Virus Scanner," Message 1 thread from Eileen Byrne Telecom 617-386-2181, dated Nov. 13, 1995, 2 pages.

Google Groups, "Virus Scanning", Message 1 Thread from John F. Reddington dated Jul. 25, 1995, 5 pages.

Google Groups, "Virus Scanning", Sara.Appleyard, Sep. 8, 1996, 5 pages.

"Integralis Announces MIMEsweeper Compatible with Check Point FireWall-1 on Single NT Server," Checkpoint Software Technologies LTD., Sep. 16, 1996, 2 pages.

Kent, Stephen T., "Internet Privacy Enhanced Email," Communications of the ACM, vol. 36, No. 8, Aug. 1993, pp. 48-60.

Lemos, Robert, "Paying Up for a Spam Seal of Approval," Jun. 24, 2002, http://news.com.com/2100-1001-938976.html, printed Feb. 19, 2003, pp. 1-3.

Mason, Justin, "SpamAssasin Prehistory: filter.plx," [Online], [retrieved on Jun. 20, 2005]. Retrieved from the internet:http://spamassasin.apache.org/prehistory/.

McCullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages.

"New Product 'E-Mail Virus Wall' protects companies from e-mail-borne viruses, including new macro viruses," Business Wire, p 02160157, Feb. 16, 1996, 3 pages.

Nicholas, Nick, "Realtime Blackhole List, Spamware Defined," downloaded on May 27, 2004 from <http://mail-abuse.org/rbl/spamware.htm, 2 pages.

Olawsky, Duane et al., "Developing and Using a 'Policy Neutral' Access Control Policy," Secure Computing Corporation, Dec. 2, 1996, pp. 60-67.

Omniva, "Omniva Policy Manager," Technical White Paper, Ominiva Policy Systems, Jan. 2004, pp. 1-23.

Oppliger, Rolf, "Internet Security; Firewalls and Bey," Communication of the ACM, vol. 40, No. 5, May 1997, pp. 92-102.

Postini Inc., "Postini Perimeter Manager: The Industry's Leading Email Security and Management Solution," Postini Inc., 2004, 4 pages.

"Prevention of Forged-Spam email via Sendmail (Relay Disable)" <http://docsrv.sco.com/MM_admin/mmadminC.spam_forge.html>, Nov. 1999.

"Product Overview—IronMail: The Secure Email Gateway Appliance," CipherTrust, 2 pages.

Prolin, P. et al., "Network Security Probe", Telecom Bretagne, Nov. 1994, pp. 229-240.

"Raptor Systems and Trend Micro to Develop Integrated Firewall/Virus Wall; Security Partnership to Protect Against Unauthorized Access and Viruses," Business Wire, p 05030072, May 3, 1996, 2 pages.

Rhyolite Software, "Distributed Checksum Clearinghouse," [Online] [Retrieved on Jun. 20, 2005], retrieved from the internet: http://www.rhyolite.com/anti-spam/dcc, pp. 1-5.

Sullivan, Andy "Buffalo Spammer Sentenced to 3-1/2 to 7 years", U.S. National-Reuters downloaded on May 27, 2004 from <http://news.yahoo.com/news?tmpl=story&u=/nm/20040527/us_nm/tech_spam_dc>, 2 pages_.

"Surf Control E-mail Filter," http://www.surfcontrol.com/uploadedfiles/SEF_datasheet.pdf, SurfControl plc., 4 pages.

"Symantic Ships Norton AntiVirus for Internet Email Gateways," PR Newswire, p 0224SFM068, Feb. 24, 1997, 4 pages.

"The Elm Filter System Guide," CETS Answers, Computing and Educational Technology Services, University of Pennsylvania, Jun. 24, 2003, 8 pages.

"The Elm Filter System Guide, What the Filter Program is, and How to Use It," San Diego State University ROHAN Academic Computing, May 29, 1996, pp. 1-8, available online at http://www-rohan.sdsu.edu/filter.html.

Trend Micro, "Policy-based Antivirus and Content Security for the Messaging Gateway," White Paper, Trend Micro Interscan Messaging Security Suite, Jun. 2002, pp. 1-20.

Trumbo, Jan et al., "Features: Big, Bad E-mail," Network Computing, Oct. 8, 1996, 4 pages, available at http://www.nwc.com/716/716f2.html.

Weisband, Suzanne P. et al., "Managing User Perceptions of Email Privacy," Communications of the ACM, vol. 38, No. 12, Dec. 1995, pp. 40-47.

1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages.

Chinese Patent Office, "Text of the First Office Action", Application No. 200680019314, dated Jul. 12, 2010, 4 pages.

Claims, Application No. 200680019314, 12 pages.

* cited by examiner

MANAGING DELIVERY OF ELECTRONIC MESSAGES USING BOUNCE PROFILES

CROSS-REFERENCE TO RELATED APPLICATIONS; PRIORITY CLAIM

This application claims domestic priority under 35 U.S.C. §119(e) from prior U.S. provisional application Ser. No. 60/575,658, entitled "Providing Temporary Access To A Network Device, Using Destination Domain-Based Bounce Profiles, Monitoring The Flow Of Messages From Senders, And Controlling The Flow Of Messages From Senders," filed May 29, 2004, naming Paul J. Clegg, Charlie S. Slater, R. Brian Harrison, Lonhyn Jasinskyj, Ben Cottrell, Eric Huss, Craig Sprosts, Krishna Srinivasan, Peter Schlampp, Shun Chen, Robert Brahms, Daniel Quinlan, and Brennan H. Evans as inventors, the entire disclosure of which is hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent & Trademark Office patent file or records, but otherwise reserves all copyright rights whatsoever. Copyright© 2001-2005 IronPort Systems, Inc.

FIELD OF THE INVENTION

The present invention relates to an approach for redelivering electronic messages based on bounce profiles.

BACKGROUND

When an attempt to send an electronic message, such as an email, from a sender to a recipient is unsuccessful, the electronic message is said to have "bounced." The term "bounce," as used herein, refers to the event of failing to successfully deliver an electronic message to a recipient. A recipient refers to any destination, such as an email address, identified in an electronic message that should receive the electronic message when the electronic message is delivered. A recipient that was sent an electronic message, but did not receive the electronic message because the electronic message bounced is referred to herein as a "bounced recipient."

When a sender initiates delivery of an electronic message to a recipient, the sender's email server sends the electronic message to the recipient's email server over a network, e.g., the Internet, and thereafter the recipient's email server delivers the electronic message to the recipient. If the recipient's email server is not able to deliver the electronic message to the recipient, the recipient's email server may deliver a message rejection response (also known as a bounce message) to the sender's email server. A bounce message, as used herein, is a message that indicates that a particular recipient did not receive a particular electronic message delivered to the recipient. Depending on the configuration of the sender's mail server, a bounce message may also appear as a new message in the sender's inbox when an electronic message sent by the sender is bounced.

There are two kinds of bounces: a hard bounce and a soft bounce. A soft bounce occurs when the sender's mail server determines that it is likely that a bounce occurred because the recipient is temporarily unavailable. For example, a soft bounce may occur when the recipient's inbox is full and unable to accommodate additional electronic messages. A bounced messaged that experiences a soft bounce may be redelivered at another time.

On the other hand, a hard bounce occurs when the sender's mail server determines that (a) it is likely that a bounce occurred because the recipient is unavailable and (b) it is likely that the recipient will continue to remain unavailable. For example, a hard bounce may occur when the recipient's address is invalid. Typically, when a hard bounce is experienced by a particular electronic message, a message ("a hard bounce inform message") is delivered to the sender of the bounced message by the sender's email server to inform the sender that the bounced message was not delivered to a bounced recipient identified in the bounced message.

A mail server typically follows the same approach in handling bounces for all electronic messages processed by the mail server. An administrator of a mail server may configure the operation of the mail server by establishing configuration information that describes how many times to attempt to redeliver an electronic message that was bounced (i.e., how many soft bounces should the mail server allow for each electronic message) before ceasing to redeliver the electronic message (i.e., determining that a hard bounce has occurred) and how long to wait between attempts to redeliver electronic messages. The mail server performs as configured for each electronic message processed by the mail server.

It is desirable to deliver electronic messages in a manner that increases the likelihood that electronic messages will be successfully delivered to their recipients. It is further desirable to promote the efficient delivery of electronic messages. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Functional Overview

Techniques are described herein for managing the delivery of electronic messages using bounce profiles. A bounce profile is a set of data that may be used by a mail server in redelivering an electronic message that was not successfully delivered (i.e., bounced) to a recipient of an electronic message. An administrator may associate a bounce profile to a trait of an electronic message, such as a domain of a recipient of the electronic message or a message type of the electronic message. A mail server may then select a bounce profile for use in processing a particular bounced electronic message based which bounce profile, stored at or accessible to the mail server, is associated with a trait of the bounced electronic message.

Figure 1:
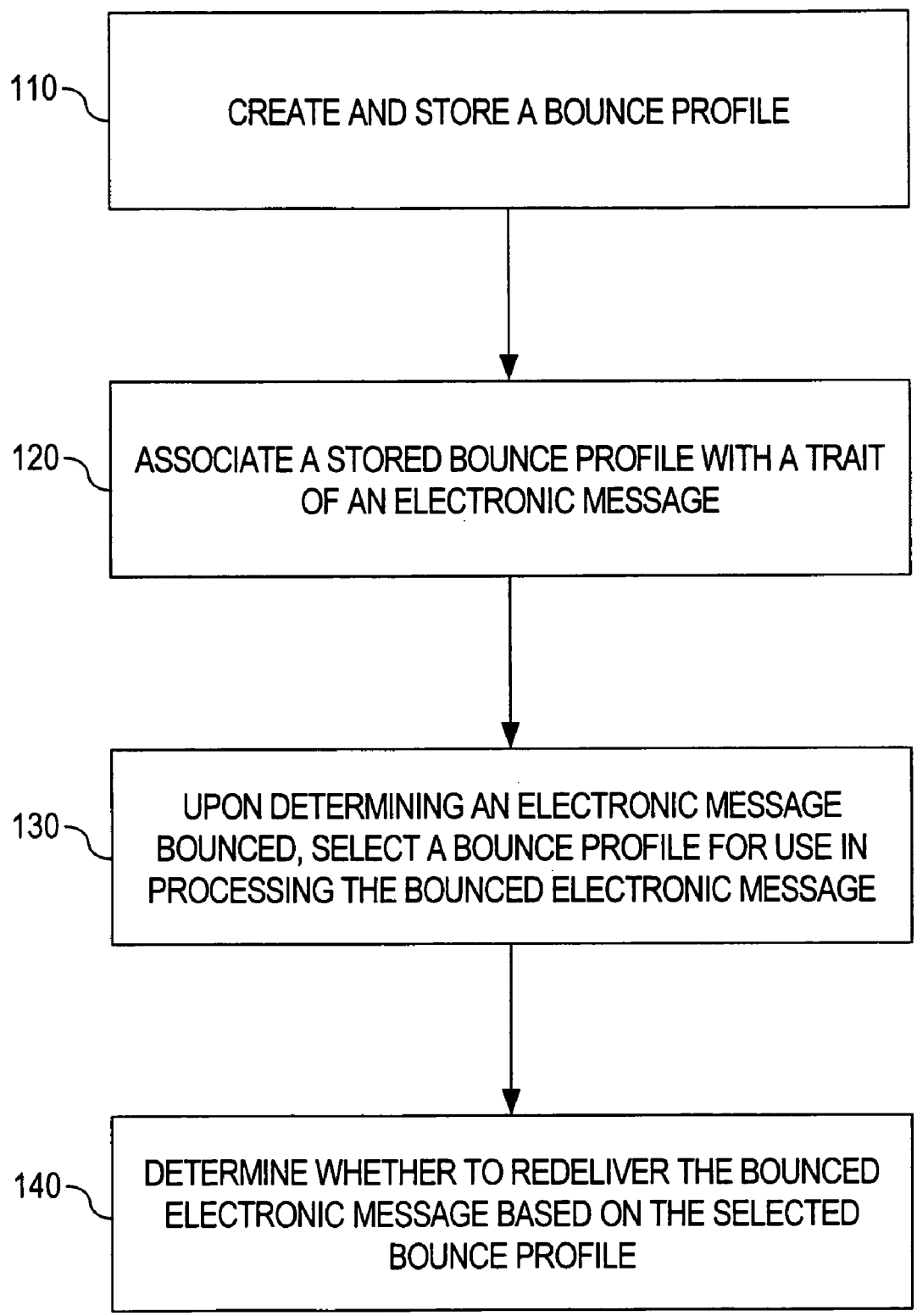
FIG. 1 is a flowchart illustrating the high level functional steps of an embodiment.

FIG. 1 is a flowchart illustrating the high level functional steps of an embodiment. In the embodiment illustrated in FIG. 1, initially, in step 110, a bounce profile is created and stored. The bounce profile created and stored in step 110 may be stored at or accessible to a network device, such as a mail server or mail transfer agent. For ease of explanation, the steps of FIG. 1 shall be explained with reference to a mail server performing the steps of FIG. 1, although other embodiments are not limited to the use of a mail server.

The administrator of the mail server may create and store any number of bounce profiles. To illustrate, the administrator of a mail server ("the sending mail server") may create and store a "busy" bounce profile to be used by the sending mail server in determining how to redeliver a bounced electronic message sent to a very busy mail server ("the receiving busy mail server"). For example, the "busy" bounce profile may indicate that the sending mail server is to make fifteen attempts to redeliver an electronic message to the receiving busy mail server and to wait thirty minutes between each redelivery attempt to the receiving busy mail server. The administrator may also establish a "not busy" bounce profile to be used by the sending mail server in determining how to redeliver a bounced electronic message sent to a mail server that generally is not very busy ("the receiving not-busy mail server"). For example, the "not busy" bounce profile may indicate that the sending mail server is to make only five attempts to redeliver an electronic message to the receiving not-busy mail server and to wait five minutes between each redelivery attempt to the receiving not-busy mail server. An administrator may also create and store a default bounce profile to be used by the sending mail server in determining how to redeliver a bounced electronic message sent to a mail server that is not otherwise associated with another bounce profile. Such a default profile may be expressly configured by an administrator, or may be dynamically generating by the sending mail server, such as by using preconfigured values or values dynamically obtained by averaging the values used of other bounce profiles.

The above characteristics of bounce profiles are merely exemplary. Further description of the information stored within a bounce profile, and how a bounce profile may be used to instruct the operation of a mail server, is provided below in the section entitled "Characteristics of a Bounce Profile." Further description of creating, storing, editing, and managing bounce profiles is provided below in the section entitled "Establishing a Bounce Profile."

After the bounce profile is stored, then in step 120, the stored bounce profile is associated with a trait of an electronic message. By associating a bounce profile with a trait of an electronic message, the sending mail server can determine which bounce profile to use when an electronic message is bounced by selecting a bounce profile that is associated with a trait of the bounced electronic message. In an embodiment, an administrator may associate a stored bounce profile with a trait of an electronic message by storing, in a location at or accessible to the sending mail server, mapping data that reflects that association.

For example, some mail servers handle a large quantity of mail, such as the mail servers for an Internet service providers such as America On Line (AOL), and thus those mail servers tend to be very busy, which increases the likelihood that a delivery attempt to those busy mail servers will fail. Other mail servers handle very little mail, such as the mail server for a small business, and thus it is rare for a delivery attempt to those mail servers to fail due to high traffic. Thus, the configuration of a mail server for redelivering bounced electronic messages may be appropriate for a busy mail server (e.g., lots of attempts coupled with a relatively long interval between redelivery attempts) may not be very suitable for a mail server that is not busy and for which fewer attempts and shorter intervals would be more appropriate. Advantageously, a mail server may use a bounce profile in determining how to redeliver a bounced electronic message to ensure that electronic messages are redelivered in a manner that increases the likelihood that electronic messages will be successfully delivered to each particular recipient of the bounced electronic message.

In the above example, an administrator may associate the busy bounce profile with the trait of a recipient associated with a busy domain. For example, a recipient may have an email address associated with a busy domain, such as America On Line (AOL). Since mail servers associated with America On Line (AOL) process a large volume of electronic messages, any recipient identified in an electronic message as being associated with the "aol.com" domain may be associated, by the administrator of the mail server, with the busy bounce profile because AOL's mail servers are known to be very busy.

On the other hand, an administrator may associate the "not busy" bounce profile with the trait of a recipient associated with a domain that is not very busy. For example, a recipient may have an email address associated with a domain that receives little traffic, such as the domain of a small company (e.g., all email addresses associated with the "xyz.com" domain, corresponding to a small XYZ Company that is known to receive a smaller volume of traffic).

Embodiments may associate a bounce profile with any trait of an electronic message. For example, a bounce profile may be associated with a message type. In this way, bounced electronic messages associated with a first sales campaign may be handled differently than bounced electronic messages associated with a second sales campaign or bounced electronic messages associated with confirmation of a purchase. Further description about associating a stored bounce profile with traits of an electronic message is provided below in the section entitled "Associating a Stored Bounce Profile With Traits of an Electronic Message."

In step 130, upon determining that an electronic message bounced, a bounce profile for use in processing the bounced electronic message is selected by the sending mail server. The sending mail server may determine that an electronic message bounced by a variety of ways, such as receiving a bounce message. The selected bounce profile may be selected based on the traits of the bounced electronic message, such as a domain associated with a bounced recipient of the bounced electronic message or a message type of the bounced electronic message. Additionally, a priority value may be stored with a bounce profile or in mapping data 214, and if more than one bounce profile is associated with a trait of the bounced electronic message, then the bounce profile having the highest priority may be selected in step 130.

After a bounce profile is selected in step 130, then in step 140, the sending mail server determines whether to redeliver the bounced electronic message to a bounced recipient of the bounced electronic message based on the selected bounce profile. If the mail server determines, based on the selected bounce profile, to redeliver the bounced electronic message, then the mail server redelivers the bounced electronic message based on the selected bounce profile.

In this way, embodiments may advantageously redeliver bounced electronic messages in a manner that increases the likelihood that the bounced electronic messages will be successfully delivered to their recipients because the characteristics of the recipients are considered when determining how to redelivery a bounced electronic message.

Architecture Overview

Figure 2:
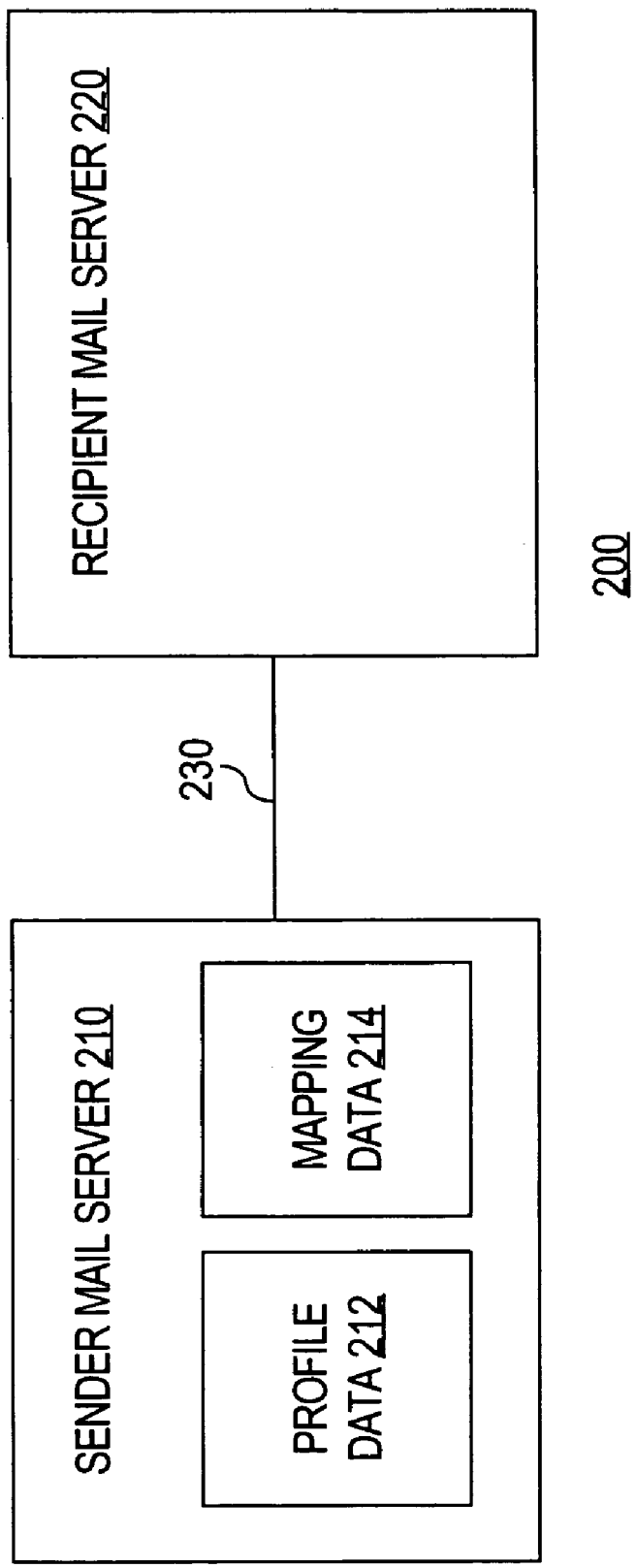
FIG. 2 is a block diagram of an illustrative system according to an embodiment.

FIG. 2 is a block diagram of an illustrative system 200 according to an embodiment. The system 200 of FIG. 2 may be used to manage the delivery of electronic messages using bounce profiles. System 200 comprises mail server 210, mail server 220, and communications link 230.

Embodiments shall be explained below with reference to mail server 210 delivering an electronic message to mail server 220, and in response to receiving the electronic message, mail server 220 delivering a bounce message to mail server 210 indicating that the electronic message was not successfully delivered to a recipient. As a result, mail server 210 is identified for ease of explanation as the sender mail server 210, and mail server 220 is identified as the recipient mail server 220.

Sender mail server 210 may be implemented using any device capable of performing the steps of FIG. 1, and recipient mail server 220 may be implemented using any device that is capable of receiving electronic messages from sender mail server 210. For ease of explanation, mail servers 210 and 220 are illustrated in FIG. 2, and described below, as being mail servers; however, mail servers 210 and 220 may be implemented by other devices than those devices traditionally identified as being a mail server. Additional details about how mail servers 210 and 220 may be implemented are provided below in the section entitled "Implementing Mechanisms."

The sender mail server 210 further comprises profile data 212 and mapping data 214. When the sender mail server 210 determines that an electronic messages sent by the sender mail server 210 has bounced, the sender mail server 210 determines how to redeliver the bounced electronic message using the profile data 212 and the mapping data 214. Profile data 212 refers to data that describes one or more bounce profiles. While profile data 212 is illustrated as being stored at sender mail server 210, profile data 212 may also be stored in any location accessible to the mail server 210. The characteristics of a bounce profile according to an embodiment shall be described in greater detail below.

Mapping data 114 refers to data that associates bounce profiles to traits of electronic messages. In one embodiment, a set of mappings is used to associate a bounce profile with a trait of an electronic message. For example, mapping data 114 may be implemented using a table that includes a mapping of bounce profile A to domain ABCD.com, bounce profile B to domain EFGH.com, bounce profile C to electronic messages associated with a particular marketing campaign, and a default bounce profile, which will be used with any domain not mapped to another bounce profile. As another example, the table may include a mapping of a bounce profile entitled "OFFER" to electronic messages sent from the address specialoffers@XYZ.com, a mapping of a bounce profile entitled "CONFIRMATION" to messages sent from the address orderconfirm@XYZ.com, and a mapping of a bounce profile entitled "DEFAULT" that is to be used for all other messages not otherwise associated with a bounce profile.

Communications links 230 may be implemented by any medium or mechanism that provides for the exchange of data between the sender mail server 210 and the recipient mail server 220. Examples of communications links 230 include, without limitation, a network such as a Local Area Network (LAN), Wide Area Network (WAN), Ethernet or the Internet, or one or more terrestrial, satellite or wireless links.

Characteristics of a Bounce Profile

As explained above, profile data 212 describes one or more bounce profiles. The composition of a bounce profile may vary from implementation to implementation. An administrator may configure any characteristic of a bounce profile. The characteristics of an illustrative bounce profile according to an embodiment are described below.

Retry Interval

In an embodiment, a bounce profile may indicate a value for a retry interval. A retry interval identifies how long the sender mail server 210 is to wait before attempting to redeliver a bounced electronic message after the sender mail server 210 determines that an electronic message sent by the sender mail server 210 experienced a soft bounce. In one embodiment, an administrator may manually configure the retry interval. In another embodiment, the retry interval may be dynamically calculated, e.g., by using the following calculation:

$$\text{retry interval(in seconds)} = (\text{\# of seconds since receipt of bounce message}) \times 2$$

A retry interval may be used in a variety of different ways. For example, the first time that an electronic message receives a soft bounce, the retry interval may be set to an initial retry interval, the value of which may be configured by an administrator. Generally, an administrator would like to set the initial retry time to a high value to reduce the frequency of redelivery attempts that result in a soft bounce. However, if the administrator wants to increase the frequency of retry attempts, the retry interval may be lowered. In an embodiment, a default retry interval value may be set by the manufacturer of mail server 210, e.g., sixty (60) seconds.

In an embodiment, a maximum retry interval may be established to limit the length of the retry interval. The maximum retry interval is configurable by the administrator. If the retry interval exceeds the maximum retry interval, then the maximum retry interval is used instead of the retry interval.

In an embodiment, the retry interval is not an exact time of when redelivery of the bounced electronic message will be attempted by sender mail server 210. For example, mail server 210 may not attempt to redeliver the bounced electronic message before the retry interval has expired. Once the retry interval expires, then sender mail server 210 may attempt to perform redelivery of the bounced electronic message, although if sender mail server 210 is busy or is in an operational state where redelivery of electronic messages is suspended, then redelivery of the bounced electronic message may not occur immediately after the expiration of the retry interval.

Hard Bounce Qualification Criteria

In an embodiment, a bounce profile may specify hard bounce qualification criteria. Hard bounce qualification criteria describes criteria that the sender mail server 210 uses in determining whether a hard bounce has occurred upon receiving a bounce message. Using the hard bounce qualification criteria, sender mail server 210 may determine whether a received bounce message should be interpreted as a hard bounce.

Various criteria may be used to determine when a received bounce message should be interpreted as a hard bounce. In an embodiment, a bounced electronic message is considered to have experienced a hard bounce when a maximum number of attempts to redeliver the bounced electronic message has been exceeded.

In another illustrative embodiment, an electronic message that has been delivered by sender mail server 210 stays in an outbound queue, maintained by sender mail server 210, until the sender mail server 210 receives an acknowledgement that the electronic message has been safely received. If a delivered electronic message stays in the outbound queue too long without an acknowledgement being received by the sender mail server 210 that the delivered electronic message has been received, then the sender mail server 210 may treat the electronic message as having experienced a hard bounce.

As yet another example, a received bounce message may be processed as a hard bounce when either of the above two conditions have been met, e.g., either the maximum number of redelivery retries has been exceeded or the maximum amount of time that the delivered electronic message can stay in an outbound queue without receiving an acknowledgement that the electronic message has been received has been exceeded, whichever comes first. A default value for the maximum number of retries may be specified, such as 100 attempts. A default value for the maximum time in queue may be specified, such as 72 hours (259,200 seconds).

Bounce profiles may specify various approaches for handling an electronic message that has experienced a hard bounce. For example, a default approach can be that the mail server 210 generates a bounce message ("a hard bounce inform message") that is sent to the original sender of the hard bounced electronic message for each bounced recipient. As another example, the mail server 210 may not send a hard bounce inform message to the original sender of the hard bounced email.

Host Retry Data

In an embodiment, a bounce profile may specify host retry data. While a bounce indicates a failed delivery attempt (e.g., the receiving mail server cannot handle or deliver the message to the intended recipient), an electronic message can be undeliverable for other reasons, such as that the receiving mail server for the recipient (e.g., the recipient host) is unreachable. For example, a recipient host may be unreachable because of problems with DNS, the network, or the host may simply be down.

In an embodiment, recipients associated with unreachable hosts are treated differently than recipients associated with reachable hosts, although the same general concepts are applied. For example, in some implementations, a host retry interval that is specific to retrying a connection to the recipient host is used. The host initial retry time is an amount of time (e.g., it may be measured in seconds) that the system 200 will wait before retrying the host after the first connection failure. A default value can be used, such as 60 seconds, or the administrator for the mail server can specify another value.

A host maximum retry interval may be used to specify the maximum time for the sender mail server 210 to wait before retrying a connection to the recipient host. A default value can be used, such as one hour (3,600 seconds), or the administrator for the sender mail server 210 can specify another value. An illustrative example of redelivering a bounced electronic message using some of the above characteristics is presented below in the section entitled "Redelivering a Message Using a Bounce Profile."

Table 1 lists several parameters that can be included in a bounce profile according to an embodiment. The table lists the parameter, a default value for the parameter, and an indication of whether the parameter applies globally to all bounced electronic messages or whether the parameter applies to only to bounced electronic messages processed by the particular bounce profile.

TABLE 1

| Parameter | Default Value | Global (G) or Per Profile (P) |
|---|---|---|
| Maximum Retries - the maximum number of delivery attempts | 100 | P |
| Maximum Time in Queue - the maximum time allowed to make deliver attempts | 72 hours | P |
| Initial Retry Time - the retry interval to use between the first and second deliver attempts | 60 seconds | P |
| Maximum Retry Time - the maximum retry interval between delivery attempts | 3600 seconds | P |
| Send Bounces - whether to send bounce messages to the original sender when the delivery attempts fail | Default | P or G |
| Send DSN - whether to send a DSN message when a hard bounce occurs | Default | P or G |
| Host Maximum Retries - the maximum number of retries for connecting to a recipient host | 20 | G |
| Host Maximum Time in Queue - the maximum time allows to make host connection attempts | 12 hours | G |
| Host Initial Retry Time - the retry interval to use between the first and second host connection attempts | 60 seconds | G |
| Host Maximum Retry Time - the maximum retry interval between host connection attempts | 3600 seconds | G |
| Send Bounces - whether to send a message informing a user that a bounce occurred (a bounce inform message) when the host connection fails | True | G |
| Bounce Address - the address to send the bounce inform message when the host connection fails | — | G |

In an embodiment, a more specific value for a particular operational characteristic identified in a bounce profile may override a default value for that operational characteristic. For example, the maximum time in queue value, listed in Table 1, which is set in a bounce profile may override a global default value. This approach allows the more specific setting of the bounce profile to take precedence over the less specific setting of the global default value, although in other implementations, the reverse can be used.

In an embodiment, any changes to the values of a bounce profile during the lifetime of an electronic message (e.g., while attempts are being made to deliver the electronic message) associated with the bounce profile can be immediately reflected during an attempt to deliver the electronic message. In this way, any changes made to a bounce profile take immediate effect, even if sender mail server 210 has been attempting to redeliver a particular electronic message, associated with the modified bounce profile, prior to the modification to the bounce profile.

In an embodiment, the possible values for the "Send Bounces" parameter are true, false, and default, where true specifies that a bounce inform message is to be sent, false specifies that a bounce inform message is not to be sent, and default specifies that the global value regarding sending bounce inform messages is to be used. In an embodiment, the possible values for the "Send DSN" parameter are true, false, and default.

The above description of parameters of a bounce profile are merely illustrative, as bounce profiles according to other embodiments may feature more or less parameters used in redelivering bounced electronic messages than those discussed above.

Establishing a Bounce Profile

Various approaches for creating, storing, editing, and managing bounce profiles may be used by embodiments. Interfaces may be provided by sender mail server 210 that allow an administrator to create, store, edit, and manage the bounce profiles stored in profile data 212. For example, in some embodiments, a graphical user interface (GUI) may be provided by sender mail server 210 to allow an administrator to configure the values of parameters of a bounce profile. After configuring the values of parameters of a bounce profile, the profile data 212 is updated to reflect the configured bounce profile. In other embodiments, a command line interface (CLI) approach is used to allow the administrator sender mail server 210 to interactively manage bounce profiles, such as by providing the capability to allow the user to add, edit, and delete bounce profiles, as illustrated by the following examples.

Creating a Bounce Profile

Bounce profiles that are created are stored in profile data 212. The following is an example of creating a bounce profile via a CLI. Values in brackets (e.g., "[ ]") represent the existing default values.

postman.example.com>bounceconfig
Current bounce profiles:
1. Default
2. "myprofile"
Enter "NEW" to create a new profile or "EDIT" to modify or "DELETE" to remove.
[ ]>new
Please create a name for the profile:
[ ]>spam
Please enter the maximum number of retries.
[100]>
Please enter the maximum number of seconds a message may stay in the queue before being hard bounced.
[259200]>
Please enter the initial number of seconds to wait before retrying a message.
[60]>
Please enter the maximum number of seconds to wait before retrying a message.
[3600]>
Current bounce profiles:
1. Default
2. "myprofile"
3. "spam"
Enter "NEW" to create a new profile or "EDIT" to modify or "DELETE" to remove.
[ ]>
postman.example.com>
Editing a Non-Default Bounce Profile The information of a bounce profile, stored in profile data 212, may be edited. The following is an example of editing a non-default bounce profile via a CLI. Values in brackets (e.g., "[ ]") represent the existing default values. In this example, any parameter, including the name of the bounce profile, may be edited.

postman.example.com>bounceconfig
Current bounce profiles:
1. Default
2. "myprofile"
Enter "NEW" to create a new profile or "EDIT" to modify or "DELETE" to remove.
[ ]>edit
Please enter the number of the profile to edit:
[ ]>2
Please enter the new name for the profile being edited:
[myprofile]>newname
Please enter the maximum number of retries.
[100]>44
Please enter the maximum number of seconds a message may stay in the queue before being hard bounced.
[259200]>3600
Please enter the initial number of seconds to wait before retrying a message.
[60]>
Please enter the maximum number of seconds to wait before retrying a message.
[3600]>1200
Current bounce profiles:
1. Default
2. "newname"
Enter "NEW" to create a new profile or "EDIT" to modify or "DELETE" to remove.
[ ]>
postman.example.com>
Editing a Default Bounce Profile The following is an example of editing a default bounce profile via a CLI. Values in brackets (e.g., "[ ]") represent the existing default values. In some implementations, the default bounce profile includes parameters that are used or incorporated into other bounce profiles (e.g., some global parameters).

postman.example.com>bounceconfig
Current bounce profiles:
1. Default
2. "myprofile"
Enter "NEW" to create a new profile or "EDIT" to modify or "DELETE" to remove.
[ ]>edit
Please enter the number of the profile to edit:
[ ]>1
Please enter the maximum number of retries.
[100]>
Please enter the maximum number of seconds a message may stay in the queue before being hard bounced.
[259200]>
Please enter the initial number of seconds to wait before retrying a message.
[60]>
Please enter the maximum number of seconds to wait before retrying a message.
[3600]>
Do you want a message sent back to the sender for each hard bounce? [Y]>
Do you want hard bounces sent to an alternate address? [N]>Y
Please enter the email address to send all hard bounces.
[ ]>test@example.com
Please enter the initial number of seconds to wait before retrying a host that is unreachable.

[60]>
Please enter the maximum number of seconds to wait before retrying a host that is unreachable.
[3600]>
Please enter the maximum number of times to retry a host that is unreachable.
[20]>
Current bounce profiles:
1. Default
2. "myprofile"
Enter "NEW" to create a new profile or "EDIT" to modify or "DELETE" to remove.
[ ]>
postman.example.com>
Deleting a Bounce Profile Information for a specific bounce profile storing in profile data 212 may be deleted. The following is an example of deleting a bounce profile via a CLI.

postman.example.com>bounceconfig
Current bounce profiles:
1. Default
2. "myprofile"
Enter "NEW" to create a new profile or "EDIT" to modify or "DELETE" to remove.
[ ]>delete
Please enter the number of the profile to delete:
[ ]>1
Error: The default profile may not be deleted.
Current bounce profiles:
1. Default
2. "myprofile"
Enter "NEW" to create a new profile or "EDIT" to modify or "DELETE" to remove.
[ ]>delete
Please enter the number of the profile to delete:
[ ]>2
Current bounce profiles:
1. Default
Enter "NEW" to create a new profile or "EDIT" to modify or "DELETE" to remove.
[ ]>
postman.example.com>
Managing Bounce Profiles in Batch Mode Bounce profiles, stored in profile data 212, may be processed in a batch mode. The following is an example of how to manage a bounce profile via a CLI using a batch mode as part of a "bounceconfig" command used at a CLI command line. In this example, a bounce profile entitled "user_prof" is created by copying the parameters from the default batch profile except the value for the maximum number of retries, which is set to ten in this example.

host.com>bounceconfig add user_prof--max_retries=10

In some implementations, a bounceconfig command based on the following syntax can be used.

bounceconfig add|edit|delete . . .
bounceconfig add profile_name [max_retries=integer]
    [--max_queue_lifetime=integer]
       [--initial_retry=integer]
    [--max_retry_timeout=integer] [--send_bounces=Y/N/D]
    [--use_dsn_bounce_format=Y/N/D]
bounceconfig edit profile_name [--max_retries=integer]
    [--max_queue_lifetime=integer]
       [--initial_retry=integer]
    [--max_retry_timeout=integer] [--send_bounces=Y/N/D]
    [--use_dsn_bounce_format=Y/N/D]
bounceconfig edit default [--max_retries=integer]
    [--max_queue_lifetime=integer]
       [--initial_retry=integer]
    [--max_retry_timeout=integer] [--send_bounces=Y/N]
    [--use_dsn_bounce_format=Y/N]
       [--bounce_address=string]
    [--host_max_retry_timeout=integer]
       [--host_intial_retry=integer]
       [--host_max_retries=integer]
bounceconfig delete profile_name Configuration Files Profile data 212 may be implemented using one or more configuration files. One or more configuration files may be stored at or accessible to the sender mail server 210 to support the use of bounce profiles. For example, a general configuration file can be used to store default values instead of including such default values in a bounce profile called "Default." As a specific example, a file called "data.cfg" can include the following default values:
    max_queue_lifetime=259200
    initial_retry=60
    max_retry_timeout=3600
    max_retries=100
    host_initial_retry=60
    host_max_retry_timeout=3600

As another example, a configuration file can include both default values for use when particular bounce profiles are not specified, along with any non-default bounce profiles, as in the following example:

```
max_queue_lifetime = 259200
initial_retry = 60
max_retry_timeout = 3600
max_retries = 100
host_initial_retry = 60
host_max_retry_timeout = 3600
host_max_retries = 20
bounce_profiles = {
    "corporate" : { initial_retry = 60, max_retry_timeout = 3600,
    max_queue_lifetime = 500000, max_retries = 200 },
    "lowpriority" : { initial_retry = 60, max_retry_timeout = 3600,
    max_queue_lifetime = 7200, max_retries = 20 }
}
```

In other implementations, a default bounce profile is created for electronic messages that are not associated with a specific non-default bounce profile, and the default bounce profile contains the default values, such as those listed above or other established by other embodiments.

Associating a Stored Bounce Profile with Traits of an Electronic Message

Bounce profiles may be associated with traits of an electronic message using a variety of mechanisms. In an embodiment, an administrator may use a GUI or a CLI, provided by sender mail server 210, to associate bounce profiles with a trait of an electronic message, and thereafter store or update mapping data 214 to reflect the association.

For example, an administrator may update mapping data 214 to reflect that an association exists between a particular bounce profile and a domain. Mapping data 214 may be implemented using a table that associates bounce profiles with domains. To illustrate using a specific example, a command (identified below as "associateProfile") may be used to associate a bounce profile with a domain in the table. The following is an example of adding an entry to the table to associate a bounce profile called "testing" with the domain "megadodo.com." Note that the bounce profile itself can be created as in the CLI examples above.

gator.ironport.com>associateProfile
    There are currently no entries configured.
    Enter "NEW" to create a new limit entry,
    "DEFAULT" to change the default, or "PRINT" to display the list.
    [ ]>new
    Enter the hostname you wish to limit.
    [ ]>megadodo.com
    Enter the system wide max concurrency value for the host "megadodo.com".
    [500]>25
    Enter the virtual gateway max concurrency value for the host "megadodo.com".
    [25]>5
    Do you wish to apply a specific bounce profile to this host?
    [N]>Y
    Please choose a bounce profile to apply:
    1. Default
    2. New Profile
    [1]>2
    Enter the name of a profile:
    [ ]>Testing
    Warning: Unless you later create a profile named "Testing", messages will be handled using the default bounce parameters.
    There are currently 1 entries configured.
    Enter "NEW" to create a new limit entry, "EDIT" to modify, "DELETE" to remove,
    "DEFAULT" to change the default, or "PRINT" to display the list.
    [ ]>

The following example illustrates how to edit an entry in the table implementing the mapping data 214 via a CLI. In this example, an entry with a profile already assigned is reassigned to the default profile.

There are currently 1 entries configured.
    Enter "NEW" to create a new limit entry, "EDIT" to modify, "DELETE" to remove,
    "DEFAULT" to change the default, or "PRINT" to display the list.
    [ ]>edit
    Enter the hostname you wish to edit.
    [ ]>megadodo.com
    Enter the system wide max concurrency value for the host "megadodo.com".
    [25]>
    Enter the virtual gateway max concurrency value for the host "megadodo.com".
    [5]>
    Do you wish to apply a specific bounce profile to this host?
    [Y]>Y
    Please choose a bounce profile to apply:
    1. Default
    2. Testing
    3. New Profile
    [2]>1
    There are currently 1 entries configured.
    Enter "NEW" to create a new limit entry, "EDIT" to modify, "DELETE" to remove,
    "DEFAULT" to change the default, or "PRINT" to display the list.
    [ ]>

The following example illustrates deleting an entry, from the mapping data 214, that associates a bounce profile to a domain.

There are currently 1 entries configured.
    Enter "NEW" to create a new limit entry, "EDIT" to modify, "DELETE" to remove,
    "DEFAULT" to change the default, or "PRINT" to display the list.
    [ ]>edit
    Enter the hostname you wish to edit.
    [ ]>megadodo.com
    Enter the system wide max concurrency value for the host "megadodo.com".
    [25]>
    Enter the virtual gateway max concurrency value for the host "megadodo.com".
    [5]>
    Do you wish to apply a specific bounce profile to this host?
    [Y]>N
    Bounce profile cleared.
    There are currently 1 entries configured.
    Enter "NEW" to create a new limit entry, "EDIT" to modify, "DELETE" to remove,
    "DEFAULT" to change the default, or "PRINT" to display the list.
    [ ]>

While the above examples illustrate bounce profiles associated to domains, bounce profiles may be associated to any possible trait of an electronic message. To illustrate, in an embodiment, bounce profiles may be associated to a message type. A message type refers to the function or role performed by the electronic message, e.g., an electronic message announcing special offers that are sent to a large number of recipients may have a first message type, and other electronic messages sent to customers to confirm orders may have a second message type. The sender may not be concerned that some of the special offer messages are not delivered, but the sender may be concerned if order confirmations were not delivered. Thus, the sender can associate a first bounce profile for use with the special offer mailings (e.g., make two delivery attempts and wait an hour between attempts) and another bounce profile for customer order confirmations (e.g., make twenty delivery attempts, waiting five minutes between each attempt).

As explained above, mapping data 214 may be used to associate an electronic message trait, such as a domain name or message type, with the name of a bounce profile. The mapping data 214 can be implemented via a table or a dictionary that identifies the association between traits and bounce profiles. In an embodiment, message traits may also be associated with (a) no bounce profiles or (b) a default bounce profile.

In some embodiments, after a user specifies that a particular electronic message trait is to be associated with an identified bounce profile, mail server 210 performs a check to ensure that the identified bounce profile exists before updating mapping data 214. If a particular bounce profile is deleted or renamed such that the new bounce profile name does not identify a valid bounce profile, mail server 210 may be configured to use a default bounce profile instead of the named (but invalid) bounce profile.

As bounce profiles may be associated to any trait of an electronic message, it is possible that the traits of a single electronic message may be associated with two or more bounce profiles. In such a case, embodiments may employ a prioritization approach to determine which bounce profile to apply if such an electronic message bounces.

For example, a bounce profile may also contain a priority parameter configured by an administrator for use in determining which bounce profile to use, e.g., the bounce profile with the highest priority may be selected for use when multiple bounce profiles are associated with the traits of a bounced electronic message.

In an embodiment, mapping data 214 may be wholly or partially implanted as a set of rules which are evaluated by the sender mail server 210 when an electronic message bounces. For example, mapping data 214 may contain one or more rules for determining which bounce profile should be selected in step 130. The following example shows a message illustrates a rule in mapping data 214 for associated electronic messages whose subject begins with the string "Priority" with a bounce profile entitled "high_priority":

```
rule1 :
    if recv-int == 'main' {
        if(subject == ' Priority') {
            bounce-profile('high_priority');
        }
    }
```

The above rule is merely exemplary of those rules that may be defined within the mapping data 214.

In an embodiment, recipient mail server 220 may be configured to transmit information to sender mail server 210 to indicate to sender mail server 210 which bounce profile sender mail server 210 should use when redelivering electronic messages to recipient mail server 220. For example, recipient mail server 220 may transmit such information in a bounce message to sender mail server 210.

In some implementations, the particular bounce profile that is associated with a trait of an electronic message is determined and applied each time the electronic message bounces. As a result, the bounce profile used in determining whether, and how, to redeliver an electronic message may be different each time that the electronic message is redelivered.

Redelivering a Message Using a Bounce Profile

Figure 3:
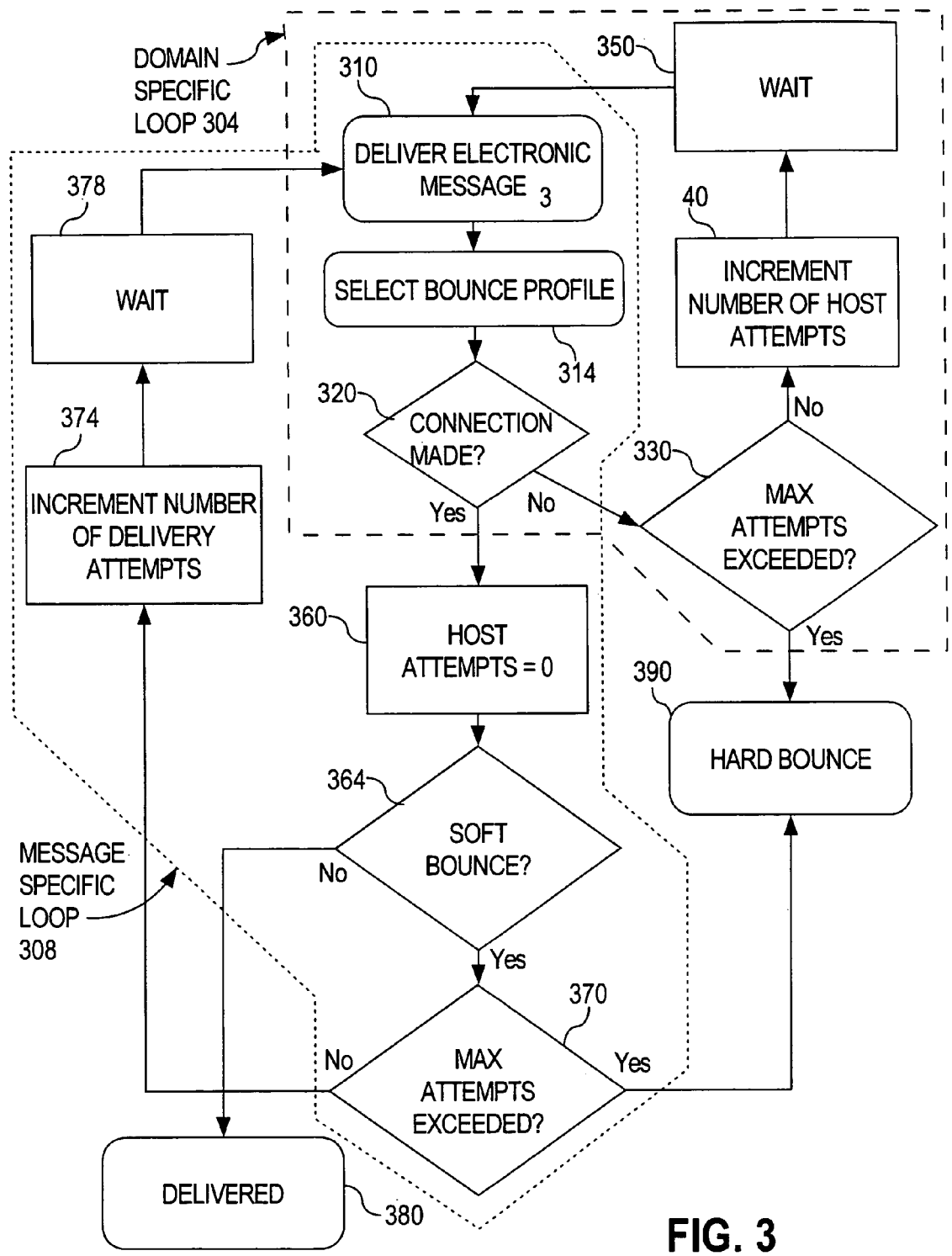
FIG. 3 is a block diagram illustrating an approach for redelivering a bounced electronic message according to an embodiment.

FIG. 3 is a block diagram illustrating an approach for redelivering a bounced electronic message according to an embodiment. The steps of FIG. 3 shall be explained below with reference to sending a single message from sender mail server 210 to a single recipient associated with recipient mail server 220. However, the techniques described below with reference to FIG. 3 may be used with any number of electronic messages sent from sender mail server 210 to any destination. Further, the techniques described with reference to FIG. 3 may also be used on electronic messages delivered to any number of recipients by performing the steps of 320-378 for each recipient identified in the electronic message.

In step 310, an electronic message is delivered from sender mail server 210 to recipient mail server 220 over communications link 230. Note that if this is the first time that step 310 is performed, then the electronic message is being delivered for the first time. However, if the electronic message bounces, then as shown in FIG. 3, either the domain specific loop 304 or the message specific loop may be taken, at which case step 310 may be performed two or more times, signifying that the electronic message is being redelivered. After the performance of step 310, processing proceeds to step 314.

In step 314, sender mail server 210 determines that the electronic message sent in step 310 has bounced. In response, sender mail server 210 selects a bounce profile for use in processing the bounced electronic message. As explained above, the bounce profile selected in step 314 is associated with a trait of the bounced electronic message. Sender mail server 210 may use mapping data 214 to determine which bounce profile, identified by profile data 212, to select in step 314. For example, if in step 310 the electronic message was sent to an email address at the abc.com domain, then the sender mail server 210 may select (a) a bounce profile associated with the abc.com domain, or (b) a default bounce profile if a bounce profile has not been associated with the abc.com domain. After the bounce profile is selected in step 314, processing proceeds to step 320.

In step 320, sender mail server 210 determines whether a connection was successfully established with the domain of the recipient, such as a connection with the recipient mail server 220. For example, sender mail server 210 may determine that a connection was successfully established with the recipient mail server 220 if the sender mail server 210 received an acknowledgement of the electronic message transmitted in step 310. Lacking any acknowledgement of the electronic message transmitted in step 310 from the recipient mail server 220, the sender mail server 210 may determine that a connection was not successfully established in step 320. If the sender mail server 210 determines that a connection was not established with recipient mail server 220, then processing proceeds to step 330.

In step 330, a determination is made by the sender mail server 210 as to whether the number of actual attempts performed by the sender mail server 210 to establish a connection with the recipient mail server 220 exceeds a maximum number of attempts to establish a connection with the recipient mail server 220. The maximum number of attempts to establish a connection with the recipient mail server 220 is identified within the bounce profile selected in step 314.

If, in step 330, it is determined that the number of actual attempts performed by the sender mail server 210 to establish a connection with the recipient mail server 220 does not exceed the maximum number of attempts to establish a connection with the recipient mail server 220, then processing proceeds to step 340. In step 340, the number of actual attempts performed by the sender mail server 210 to establish a connection with the recipient mail server 220 is incremented by one. Sender mail server 210 may store a counter that maintains the number of actual attempts performed by the sender mail server 210 to establish a connection with the recipient mail server 220. After the performance of step 340, processing proceeds to step 350.

In step 350, sender mail server 210 determines what the host retry interval is based on the selected bounce profile selected in step 314, and thereafter waits until the host retry interval has expired. The host retry interval is identified in the bounce profile selected in step 314. Once the host retry interval has expired, processing proceeds back to step 310, which corresponds to the next redelivery attempt.

Note that steps 310, 314, 320, 330, 340, and 350 are identified as belonging to a destination specific loop 304, which refers to group of steps involved in redelivering bounced electronic messages based on parameters identified in the bounce profile associated with the domain of the recipient of the bounced electronic message. The steps of destination specific loop 304 are distinguished from the steps of message specific loop 308, which refers to a group of steps involved in redelivering bounced electronic messages based on parameters identified in the bounce profile associated with the bounced electronic message.

If, in step 320, sender mail server 210 determines that a connection was established with recipient mail server 220, then processing proceeds to step 360. In step 360, sender mail server 210 sets the number of attempts to make a connection with recipient mail server 220 to zero. The motivation for performing step 360 is for situations in which a connection is successfully established with the recipient mail server 220, but subsequently the recipient mail server 220 is unreachable (e.g., the recipient mail server 220 crashes, etc.). In such a situation, the host retry attempt counter is reset so that previous attempts to connect to the recipient mail server 220 made prior to establishing a successful connection are not considered if problems with the recipient mail server 220 subsequently develop. However, in other embodiments, the performance of step 360 is optional. After the performance of step 360, processing proceeds to step 364.

In step 364, sender mail server 210 determines whether a soft bounce has occurred. The criteria for determining whether a soft bounce has occurred are identified in the bounce profile selected in step 314. If the sender mail server 210 determines that a soft bounce has not occurred, then the electronic message sent in step 310 was successfully delivered, as reflected in step 380. On the other hand, if the sender mail server 210 determines that a soft bounce has occurred, then processing proceeds to step 370.

In step 370, sender mail server 210 determines whether the number of attempts to redeliver the bounced electronic message exceeds the maximum number of redelivery attempts. If the number of attempts to redeliver the bounced electronic message has exceeded the maximum number of redelivery attempts, then processing proceeds to step 390. On the other hand, if the number of attempts to redeliver the bounced electronic message has not exceeded the maximum number of redelivery attempts, then processing proceeds to step 374.

In step 374, the number of redelivery attempts is incremented by one to maintain a running total of the number of attempt the sender mail server 210 has made to deliver the electronic message sent in step 310. After the performance of step 374, processing proceeds to step 378.

In step 378, sender mail server 210 waits for the length of time indicated by the retry interval indicated in the bounce profile selected in step 314. After the performance of step 378, processing proceeds to step 310, which corresponds to the next attempt to deliver the bounced electronic message.

In step 390, since the sender mail server 210 determined that the number of attempts to redeliver the bounced electronic message has exceeded the maximum number of redelivery attempts, the sender mail server 210 concludes that a hard bounce has occurred, and performs any actions associated with the occurrence of a hard bounce.

Implementing Mechanisms

In an embodiment, sender mail server 210 and recipient mail server 220 may each be implemented using a mail transfer agent. A mail transfer agent acts as (a) a gateway between networks and (b) a mail server for sending and receiving email messages. Illustrative, non-limiting examples of a mail transfer agent include the IronPort A-Series Messaging Gateway Appliances and C-Series Messaging Gateway Appliances produced by IronPort Systems, Inc., of San Bruno, Calif.

The IronPort A-Series family of mail transfer agents includes two messaging gateway devices, the A30 and A60, both of which provide high performance email delivery to a large number of recipients, which may be used for commercial email delivery of transaction confirmations or customer newsletters. The A30 can deliver at least 600,000 email messages per hour, and the A60 can deliver at least 1,000,000 messages per hour, both of which are much greater than can be achieved by traditional open-source mail transport agents (MTAs), such as general-purpose servers running sendmail or qmail. Mail transfer agents such as the IronPort A-Series family are sometimes referred to as "injectors" because such mail transfer agents inject messages into another mail transfer agents, such as by sending email through the Internet from a sender that is associated with one mail transfer agents to a recipient that is associated with another mail transfer agents.

The IronPort C-Series family includes three email security appliances, the C10, C30 and C60, which provide threat protection, block spam and viruses, and enable corporate email policy enforcement. The email security appliances in the C-Series family are deployed between an organization's firewall and groupware servers, such as Exchange™, Notes™, and GroupWise™, to power and protect email flowing in from or out to the Internet.

The different A-Series and C-Series appliances include one or both of the following non-IronPort technologies: the Sophos™ anti-virus technology and the Brightmail™ anti-spam technology.

The C-Series appliances and optionally the A60 appliance include the Sophos™ anti-virus technology. Sophos employs multiple techniques to detect and clean all major forms of viruses, including advanced emulation technology to detect polymorphic viruses and an on-line decompressor for scanning multi-layer attachments. Administrators can take any of several actions to handle messages that are identified as being infection by Sophos. For example, actions include cleaning the message, dropping the attachment, modifying the subject header, deleting the entire infected message, sending an optional notification, or a combination of these actions. The Sophos engine shares information with the IronPort C-Series Mail Flow Monitor to provide real-time and historical reports. During a virus outbreak, the period from the start of the outbreak until an anti-virus identify file is deployed can be covered by IronPort's content scanning technology to identify viruses based on known patterns, or messages can be deleted or archived until new identity files are updated.

The C-Series IronPort appliances include the Brightmail™ anti-spam technology, which is optimized to work with IronPort's AsyncOS™. Brightmail uses real-time methods to identify spam through Brightmail's Probe Network™ and generates approximately 30,000 new rules a day. Automatic rule updates are used, with rules automatically downloaded from the Brightmail servers typically every ten minutes to provide real-time protection. Administrators can take any of several actions to handle messages that are flagged as spam by Brightmail. The actions include sending the messages to a per-recipient web quarantine, marking up the subject header, adding an additional "X-header," sending the message to an alternate folder in the user's mailbox, deleting or bouncing the message, or a combination of these actions. The Brightmail system shares information with the IronPort C-Series Mail Flow Monitor to provide real-time and historical reports that are available at any time.

Figure 4:
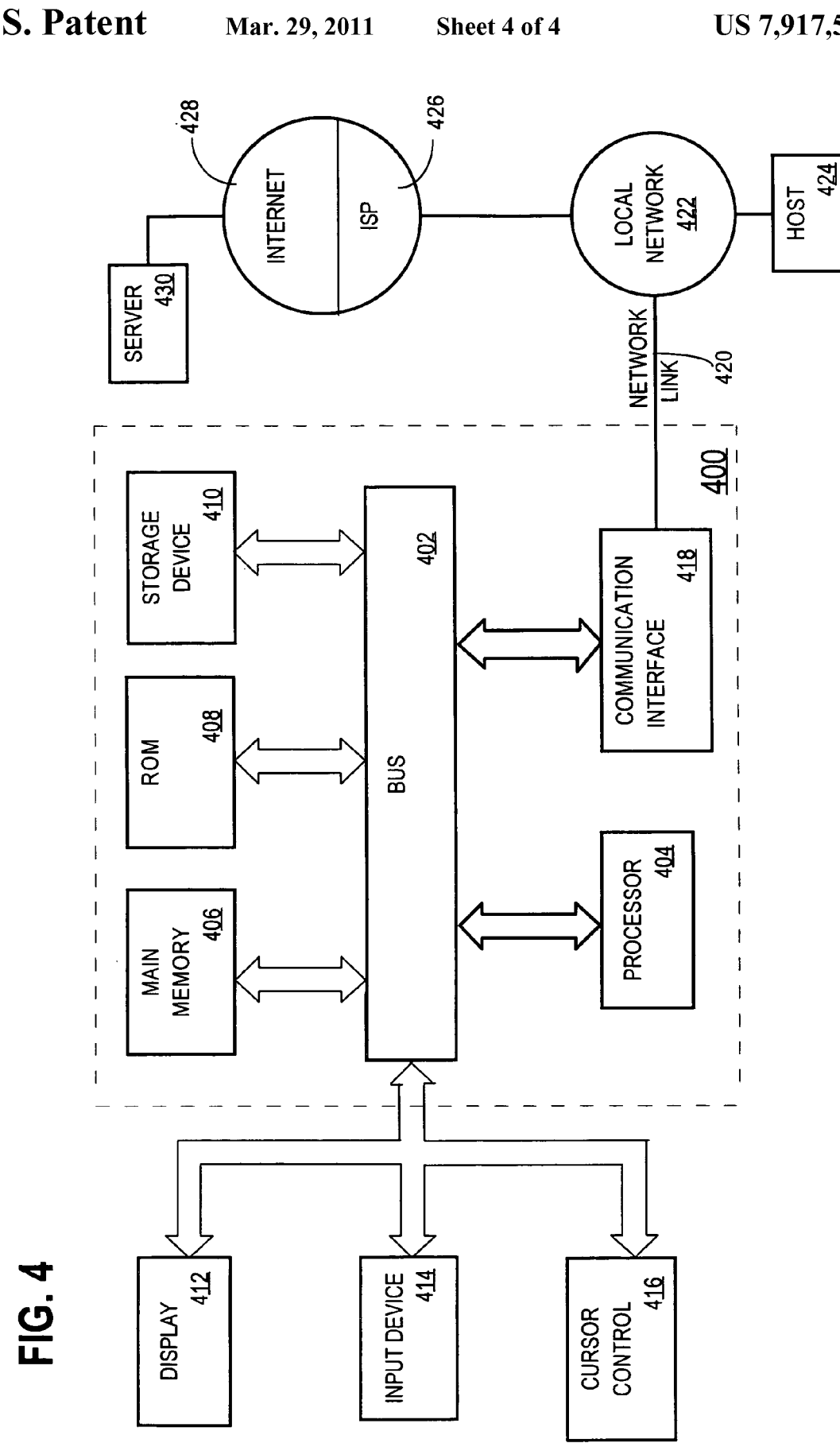
FIG. 4 is a block diagram that illustrates a computer system upon which an embodiment may be implemented.

In another embodiment, sender mail server 210 and recipient mail server 220 may each be implemented using a general-purpose computer system that is programmed to perform the functions described herein. FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, and volatile media. Non-volatile media includes, for example, optical or magnetic disks, such as storage device 410. Volatile media includes dynamic memory, such as main memory 406.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing the delivery of an electronic email message, comprising:

storing two or more bounce profiles, wherein each bounce profile, of the two or more bounce profiles, identifies how to repeat delivery of electronic email messages that have been sent to, but not received by, their recipients;

only for bounced electronic email messages, upon receiving an indication that a particular electronic email message was not received by a particular recipient of the particular electronic email message, selecting first and second particular bounce profiles, of said two or more bounce profiles, wherein the first and second particular bounce profiles identify how to repeat delivery of the particular electronic email message;

wherein the first particular bounce profile is associated with an Internet domain of the particular recipient of said particular electronic email message, wherein the second particular bounce profile is associated with a role that said particular electronic email message performs;

employing a prioritization approach to the first and second particular bounce profiles to determine a selected particular bounce profile for repeating delivery of the particular electronic email message for determining whether to redeliver said particular electronic email message by repeating delivery of said particular electronic email message to said particular recipient based on said selected bounce profile;

wherein the bounce profile prioritization approach is selected from the group consisting of: the Internet domain of the particular recipient of said particular electronic email message, a role that said particular electronic email message performs, and the particular recipient of said particular electronic email message;

wherein the determining whether to redeliver said particular electronic email message comprises determining, based on said selected particular bounce profile, a maximum number of allowed attempts to establish a connection with said Internet domain;

wherein the method is performed by one or more processors.

2. The method of claim 1, wherein the step of determining whether to redeliver said particular electronic email message further comprises:

determining whether a number of actual attempts to establish a connection with said domain exceeds said maximum number of allowed attempts to establish a connection with said Internet domain; and upon determining that the number of actual attempts to establish a connection with said Internet domain exceeds said maximum number of allowed attempts to establish a connection with said Internet domain, generating a hard bounce message for said particular electronic email message.

3. The method of claim 1, wherein the step of determining whether to redeliver said particular electronic email message further comprises:

determining, based on said selected particular bounce profile, a time to wait after an unsuccessful attempt to establish a connection with said Internet domain before attempting to establish a second connection with said Internet domain; and upon determining that said time has expired, attempting to establish the second connection with said Internet domain.

4. The method of claim 1, further comprising:

determining, based on said selected particular bounce profile, a maximum number of allowed delivery attempts for said particular electronic email message; determining whether a number of actual number of delivery attempts for said particular electronic email message exceeds said maximum number of allowed delivery attempts for said particular electronic email message; and upon determining that the actual number of delivery attempts for said particular electronic mail message exceeds said maximum number of allowed delivery attempts for said particular electronic email message, generating a hard bounce message for said particular electronic email message.

5. The method of claim 1, further comprising:

determining, based on said selected particular bounce profile, a time to wait after an unsuccessful attempt to delivery said particular electronic email message before attempting to resend said particular electronic email message to said particular recipient; and upon determining that said time has expired, resending said particular electronic email message to said particular recipient.

6. A non-transitory machine-readable volatile or non-volatile storage medium storing one or more sequences of instructions for managing the delivery of an electronic email message, wherein execution of the one or more sequences of instructions by one or more processors causes the one or more processors to perform the steps of:

storing two or more bounce profiles, wherein each bounce profile, of the two or more bounce profiles, identifies how to repeat delivery of electronic email messages that have been sent to, but not received by, their recipients;

only for bounced electronic email messages, upon receiving an indication that a particular electronic email message was not received by a particular recipient of the particular electronic email message, selecting first and second particular bounce profiles, of said two or more bounce profiles, wherein the first and second particular bounce profiles identify how to repeat delivery of the particular electronic email message;

wherein the first particular bounce profile is associated with an Internet domain of the particular recipient of said particular electronic email message, wherein the second particular bounce profile is associated with a role that said particular electronic email message performs;

employing a prioritization approach to said first and second particular bounce profiles to determine a selected particular bounce profile for repeating delivery of the particular electronic email message, and for determining whether to redeliver said particular electronic email message by repeating delivery of said particular electronic email message to said particular recipient based on said selected particular bounce profile;

wherein the bounce profile prioritization approach is selected from the group consisting of: the Internet domain of the particular recipient of said particular electronic email message, a role that said particular electronic email message performs, and the particular recipient of said particular electronic email message;

wherein the instructions that cause determining whether to redeliver said particular electronic email message further comprise instructions, which when executed, cause determining, based on said selected particular bounce profile, a maximum number of allowed attempts to establish a connection with said Internet domain.

7. The non-transitory machine-readable volatile or non-volatile storage medium of claim 6, wherein the instructions that cause determining whether to redeliver said particular electronic email message further comprise instructions, which when executed, cause:

determining whether a number of actual attempts to establish a connection with said Internet domain exceeds said maximum number of allowed attempts to establish a connection with said Internet domain; and upon determining that the number of actual attempts to establish a connection with said Internet domain exceeds said maximum number of allowed attempts to establish a connection with said Internet domain, generating a hard bounce message for said particular electronic email message.

8. The non-transitory machine-readable volatile or non-volatile storage medium of claim 6, wherein the step of instructions that cause determining whether to redeliver said particular electronic email message further comprise instructions, which when executed, cause:

determining, based on said selected particular bounce profile, a time to wait after an unsuccessful attempt to establish a connection with said Internet domain before attempting to establish a second connection with said Internet domain; and upon determining that said time has expired, attempting to establish the second connection with said Internet domain.

9. The non-transitory machine-readable volatile or non-volatile storage medium of claim 6, comprising instructions, which when executed by the one or more processors, cause the one or more processors to perform the steps of:

determining, based on said selected particular bounce profile, a maximum number of allowed delivery attempts for said particular electronic email message;

determining whether a number of actual number of delivery attempts for said particular electronic email message exceeds said maximum number of allowed delivery attempts for said particular electronic email message; and upon determining that the actual number of delivery attempts for said particular electronic email message exceeds said maximum number of allowed delivery attempts for said particular electronic email message, generating a hard bounce message for said particular electronic email message.

10. The non-transitory machine-readable volatile or non-volatile storage medium of claim 6, further comprising-instructions, which when executed by the one or more processors, cause the one or more processors to perform the steps of:

determining, based on said selected particular bounce profile, a time to wait after an unsuccessful attempt to delivery said particular electronic email message before attempting to resend said particular electronic email message to said particular recipient; and upon determining that said time has expired, resending said particular electronic email message to said particular recipient.

11. An apparatus for managing the delivery of an electronic email message, comprising: one or more processors; and a non-transitory machine-readable volatile or non-volatile storage medium storing one or more sequences of instructions for managing the delivery of an electronic message, wherein execution of the one or more sequences of instructions by one or more processors causes the one or more processors to perform the steps of:

storing two or more bounce profiles, wherein each bounce profile, of the two or more bounce profiles, identifies how to repeat delivery of electronic email messages that have been sent to, but not received by, their recipients;

only for bounced electronic email messages, upon receiving an indication that a particular electronic email message was not received by a particular recipient of the particular electronic email message, selecting first and second particular bounce profiles, of said two or more bounce profiles, wherein the first and second particular bounce profiles identify how to repeat delivery of the particular electronic email message;

wherein the first particular bounce profile is associated with an Internet domain of the particular recipient of said particular electronic email message, wherein the second particular bounce profile is associated with a role that said particular electronic email message performs;

employing a prioritization approach to the first and second particular bounce profiles to determine a selected particular bounce profile for repeating delivery of the particular electronic email message and determining whether to redeliver said particular electronic email message by repeating delivery of said particular electronic email message to said particular recipient based on said selected particular bounce profile;

wherein the bounce profile prioritization approach is selected from the group consisting of: the Internet domain of the particular recipient of said particular electronic email message, a role that said particular electronic email message performs, and the particular recipient of said particular electronic email message;

wherein the instructions that cause determining whether to redeliver said particular electronic email message further comprise instructions, which when executed, cause determining, based on said selected particular bounce profile, a maximum number of allowed attempts to establish a connection with said Internet domain.

12. The apparatus of claim 11, wherein the instructions that cause determining whether to redeliver said particular electronic email message further comprise instructions, which when executed, cause:

determining whether a number of actual attempts to establish a connection with said Internet domain exceeds said maximum number of allowed attempts to establish a connection with said domain; and upon determining that the number of actual attempts to establish a connection with said Internet domain exceeds said maximum number of allowed attempts to establish a connection with said Internet domain, generating a hard bounce message for said particular electronic email message.

13. The apparatus of claim 11, wherein instructions that cause determining whether to redeliver said particular electronic email message further comprise instructions, which when executed, cause:

determining, based on said selected particular bounce profile, a time to wait after an unsuccessful attempt to establish a connection with said Internet domain before attempting to establish a second connection with said Internet domain; and upon determining that said time has expired, attempting to establish the second connection with said Internet domain.

14. The apparatus of claim 11, further comprising instructions, which when executed by one or more processors, cause the one or more processors to perform the steps of:

determining, based on said selected particular bounce profile, a maximum number of allowed delivery attempts for said particular electronic email message;

determining whether a number of actual number of delivery attempts for said particular electronic email message exceeds said maximum number of allowed delivery attempts for said particular electronic email message; and upon determining that the actual number of delivery attempts for said particular electronic email message exceeds said maximum number of allowed delivery attempts for said particular electronic email message, generating a hard bounce message for said particular electronic email message.

15. The apparatus of claim 11, further comprising instructions, which when executed by one or more processors, cause the one or more processors to perform the steps of:

determining, based on said selected particular bounce profile, a time to wait after an unsuccessful attempt to deliver said particular electronic email message before attempting to resend said particular electronic email message to said particular recipient; and upon determining that said time has expired, resending said particular electronic email message to said particular recipient.

* * * * *